April 2, 1935.  A. G. PENDLETON  1,996,625
LIQUID HEATING SYSTEM
Filed Dec. 9, 1930
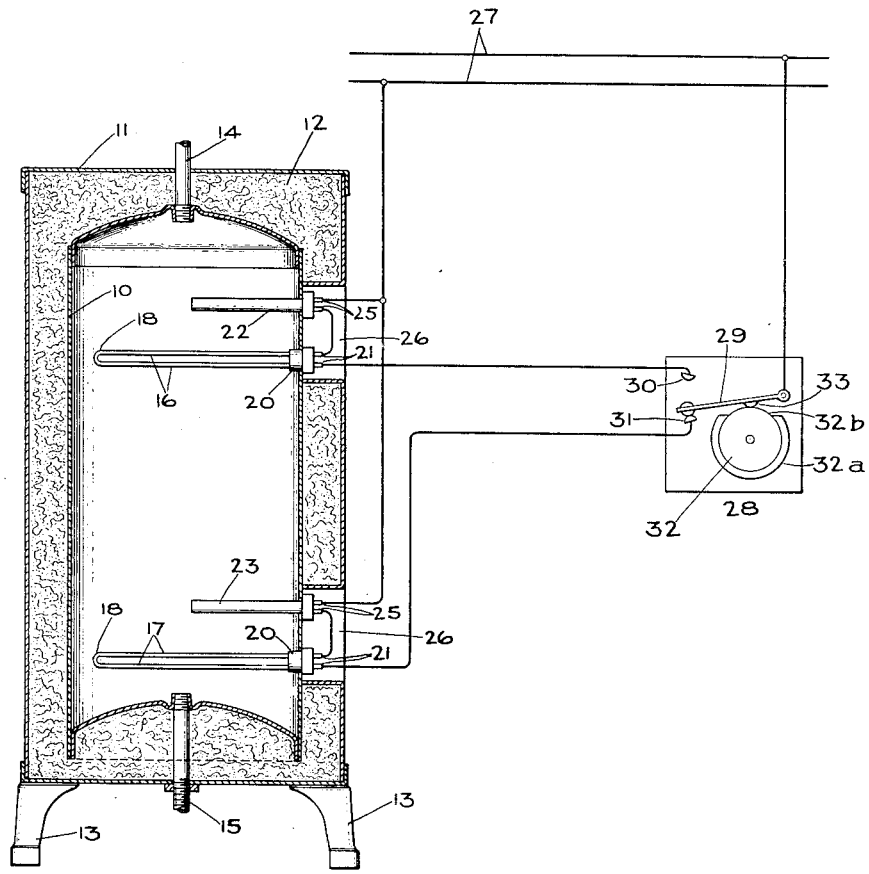
Inventor:
Alexander G. Pendleton,
by Charles E. Mullen
His Attorney.

Patented Apr. 2, 1935

1,996,625

UNITED STATES PATENT OFFICE 1,996,625

LIQUID HEATING SYSTEM

Alexander G. Pendleton, Hartford, Conn., assignor to General Electric Company, a corporation of New York Application December 9, 1930, Serial No. 501,069

3 Claims. (Cl. 219—39)

My invention relates to liquid heating systems, more particularly to electric water heating systems, and has for its object the provision of an improved heating system of this character.

More specifically, my invention relates to electrical water heating systems such as are commonly used in dwellings and homes wherein the hot water daily consumption usually is relatively small, but at times may be rather large. It is desirable, under certain conditions of operation of the power plant which supplies the heating energy for such systems, that the major portion of the electrical power utilized in heating the water be consumed during the off-peak periods of the plant; thus, for example, if the power plant operates under a heavy day industrial load but has a comparatively light night load, it is desirable that the major portion of the power utilized by the water heating system be consumed during the night; i. e., during the off-peak period of the power system. This results in the economic use of relatively large amounts of electrical energy in the home in that the electrical supply system can operate at a higher load factor, and consequently can afford to give the consumer more favorable rates.

However, while it is desirable that the major portion of the electrical energy required by the water heating system be consumed during off-peak periods of the power system, it is not economic generally to provide the heating system with such a large storage capacity that the water heated and stored during the off-peak periods will satisfy both the normal daily hot water demands and also those intermittent relatively heavy daily demands such as are occasioned by the laundry, etc. If such were the case, i. e., if water were to be heated and stored during the off-peak periods in quantities sufficiently large to meet both the ordinary daily needs and also the maximum daily consumption encountered, it is possible that the size and cost of the storage apparatus, the energy losses, etc., would be excessive.

In one of its aspects, therefore, my invention contemplates the provision of a simple, reliable and inexpensive water heating system in which water is heated and stored during the off-peak periods of the power system in quantities sufficiently large to meet the normal daily hot water demands; but if at any time during the day the hot water consumption be so great that there be a likelihood of its exceeding the storage capacity of the system, an additional supply of hot water will be provided where it is available for immediate use, the foregoing being accomplished in such a manner as to result in a minimum percentage of energy consumption during the day time, or in other words, during the peak load periods of the power system.

In carrying my invention into effect in one form thereof, I provide separate means for applying heat to the upper and lower portions of a suitable water storage tank and control the heating means responsively to suitable intervals of time so that they will be rendered effective to apply heat to their respective tank portions selectively for predetermined intervals of time. More specifically, in one form of my invention the heating means is controlled by suitable timing mechanism so that the lower heating means only is rendered effective to apply heat during the off-peak periods of the power system, such for example, as the hours of the night, while the upper heating means only is rendered effective to apply heat to the upper portions of the tank during the hours of the day. I further provide suitable thermostatic mechanism for controlling the separate heating means, preferably responsively to the temperatures of the water substantially at the respective levels of the heating means.

By reason of the foregoing arrangement the lower heating means will be utilized during the off-peak periods of the power system to heat the water in the storage tank to a suitable predetermined high temperature, the upper heating means being utilized during the relatively heavy load periods of the power system to recuperate a quantity of hot water only in the event there be a material decrease in the hot water storage supply.

For a more complete understanding of my invention reference should be had to the accompanying drawing in which the single figure illustrates in diagrammatic form a water heating system embodying my invention.

Referring to the drawing, my invention in one form comprises a suitable metallic water storage tank 10 which is provided with a suitable outer enclosing metallic casing 11. As shown, the top, bottom and side walls of the tank 10 are surrounded with suitable heat insulating material 12, such as rock wool. It will be understood that the tank 10 will be mounted in its enclosing casing 11 and will be supported therein in spaced relation with the casing by any suitable means, such for example as by means of suitable supporting and spacing blocks (not shown). The casing 11 together with the storage tank 10 are supported upon suitable legs 13. It is generally desirable that the water storage tank 10 be placed in a vertical position as shown.

A hot water service pipe 14 communicates with the top of the storage tank 10; and a suitable inlet pipe 15 for cold water is located at the bottom of the tank so that the cold water will be delivered to the tank at a point very close to the bottom wall.

I provide suitable means for applying heat to the water in the upper and lower portions of the storage tank 10. As shown, this heating means comprises a plurality of heating elements 16 and 17, the heating element 16 being located in the upper portion of the tank, while the element 17 is located in the lower portion of the tank. Preferably and as shown, the heating elements 16 and 17 will be of the immersion type such as described and claimed in the United States Patent granted to C. G. Abbott, No. 1,522,922, dated January 13, 1925; and briefly each element comprises a unit having an outer metallic sheath 18 in which a helical resistance conductor (not shown) is embedded in a compacted insulating material such as magnesium oxide (not shown). It will be understood that such units can be bent easily into any desired shape. In the immersion heaters shown this unit is bent substantially in the form of a hairpin. Obviously, however, various other arrangements and configurations may be used. Each heating element comprising the hairpin unit is provided with a screw supporting plug 20, and each is provided with suitable terminals 21 so that the embedded resistance conductor can be electrically connected with a suitable source of electrical supply. As thus constructed, the heating elements 16 and 17 are applied to the storage tank by inserting them through suitable apertures provided for them in the side walls of the tank, each aperture being provided with a threaded portion for receiving the screw plug portion 20 of the heating element.

While electrical heating elements of the immersion type have been shown, it will be understood, of course, that various other types may be used; thus, for example, heating elements which are intended to apply heat to the exterior of the tank, such as heaters of the "clamp on" type, may be used.

As has been pointed out in a previous portion of this specification, the lower heating element 17 preferably will be used during the off-peak periods of the power system, which is utilized to supply the electrical heating energy, to heat substantially the entire contents of the tank 10 to a suitable predetermined high temperature, whereas the upper heating element 16 will be used only during the day periods, and then merely to recuperate a quantity of hot water in the event the hot water supply has been depleted considerably. Therefore, the element 17 will be positioned in the lower portion of the tank as close to its bottom wall as is practical, while the upper heating element 16 will be positioned at some suitable distance from the top of the tank so that a suitable quantity of water, such for example as approximately one-fifth of tank capacity, will be available above the unit.

The heating means comprising the heating elements 16 and 17 are provided with suitable thermostatic control mechanism which comprises a thermostat 22 located in the upper portion of the tank for controlling the upper heating element 16 and a thermostat 23 located in the lower portion of the tank for controlling the lower heating element 17. These thermostats 22 and 23 are located in the tank so that they will control the heating elements in accordance with the temperatures of those portions of the water in the tank which are substantially at the levels of the respective elements. Preferably, however, the thermostats will be located slightly above their associated heating element.

The thermostats 22 and 23 may have any preferred well known construction; it is believed, therefore, to be unnecessary for a proper understanding of this invention to describe in detail their mechanical arrangement and construction. It is believed sufficient to state that each of the thermostats 22, 23 is provided with a suitable temperature responsive element (not shown), which element either is included in the electrical circuit to be controlled or controls a suitable switching device which is included in the circuit to be controlled. I have indicated suitable terminal members for the thermostats by the numeral 25, it being understood that these terminals serve to connect the thermostats in the respective heating circuits which are to be controlled.

Suitable receptacles 26 are provided for receiving the terminals 21 and 25 provided for the heating elements and thermostats respectively. As shown, each of these receptacles communicates with the exterior of the enclosing casing 11; it will be understood that these receptacles preferably will be provided with suitable cover members (not shown) that will be detachably secured in some suitable fashion to the enclosing casing.

A suitable source of electrical supply 27 is provided for the heating elements 16 and 17. Interposed in the electrical connections between the heating elements and the electrical supply source is a suitable time element switching mechanism 28. This switching mechanism, which is shown diagrammatically, includes a suitable switch arm 29 pivotally mounted to move between a pair of controlling positions, in which positions are located suitable contacts 30 and 31 respectively.

The switch 28 is connected in the electrical connections between the heating elements and the electrical supply source 27 so that when the switch arm 29 is in its lower controlling position, as viewed in the figure, in engagement with the contact 31, the lower heating element 17 together with its controlling thermostat 23 will be connected to the supply source 27, whereas if the switch arm 29 be in its upper controlling position in engagement with the contact 30 the upper heating element and its controlling thermostat will be included in an electrical circuit with the electrical supply source 27.

The switch arm 29 is moved alternately between its controlling positions at predetermined intervals of time by suitable timing mechanism, such as a suitable clockwork mechanism (not shown in detail). This timing mechanism comprises a suitable cam 32 provided to actuate the switch arm 29, this cam preferably being driven at a constant speed by the clockwork mechanism. As shown, the cam member 32 is provided with a pair of concentric cam surfaces 32a and 32b arranged to engage a suitable cam follower 33 provided on the switch arm 29. These cam surfaces are arranged and proportioned so that when the surface 32a is in engagement with the follower 33, the switch arm will be held in its upper controlling position in engagement with the contact 30 so as to complete a circuit from the supply source 27 to the upper heating element and thermostat, and so that when the surface 32b is in engagement with the follower 33, the switch arm will be in its lower controlling position so as to complete a circuit from the supply source through the contact 31 to the lower heating element and thermostat.

It will be observed that by suitably proportioning the relative lengths of the concentric cam surfaces 32a and 32b and by suitably controlling the speed with which the cam 32 is rotated by the clockwork mechanism, the switch arm 29 may be moved from one to the other of its controlling positions at suitable intervals of time, or in other words, will be maintained in its respective controlling positions for suitable periods of time. Consequently, the periods of time during which the heating elements 16 and 17 are effective to apply heat to the upper and lower portions respectively of the storage tank are controlled by the arrangement and motion of the cam member 30.

In the operation of the system it is contemplated that the timing mechanism 28 will be adjusted so that at some determined hour, as for example 11:00 p. m., which hour will mark the beginning of the off-peak load period of the system 27, the cam 32 will have been advanced to such a point that the cam surface 32a will leave the follower 33 thereby permitting the switch arm 29 to move to its lower controlling position. This operation, as has been pointed out, renders the lower heating element effective. It will be understood that if at this time the water in the tank be cold, the lower heating element will be energized through its thermostat 23 to heat the water substantially uniformly to some suitable predetermined high temperature, such as 170° F., whereupon the thermostat will operate to disconnect the heating element from the supply source. If for any reason, as for example through radiation losses, the temperature of the water should drop slightly, the thermostat will operate to reconnect the heating element 17 to the source 27 so as to maintain the predetermined high temperature of 170° F.

At some suitable hour which will mark the end of the off-peak period, as for examle 7:00 a. m., the cam will have advanced its surface 32a to such a point that it will engage the follower 33 and thereby cause the switch arm 29 to move to its upper controlling position whereupon the lower heating element will be disconnected from the supply source 27 and the upper heating element 16 will be rendered effective to apply heat to the upper portions of the tank if it is necessary to do so.

It will be observed that the operation of the heating element 17 during the off-peak periods of the power system will have rendered available for immediate use a considerable quantity of hot water. It is contemplated that this quantity will be sufficiently large to meet the normal daily hot water demands, and therefore, as long as the hot water demand does not exceed that usually required it is contemplated that the upper heating element 16 will not be energized.

However, on heavy hot water demand days, such for example as on laundry days, it is quite likely that the hot water stored in the tank by the operation of the heating element 17 during the off-peak period will be insufficient. In this event the cold water level, which will have been gradually rising in the tank by reason of the hot water draw-offs, finally will reach the upper thermostat 22 which will immediately operate to effect an energization of the upper heating element 16. The upper heating element 16 thereupon will operate to recuperate a quantity of hot water in the upper portion of the tank where it is available for immediate use. The upper thermostat preferably will be so set that the circuit to the upper heating element 16 will be opened when the water in the upper portion of the tank reaches the selected high temperature of 170° F.; and preferably will be adjusted to reclose the heating circuit when the temperature of the water in this portion of the tank reaches approximately 130° F.

At the end of the day, as for example at 11:00 p. m., the upper heating element together with its controlling thermostat will be cut off from the electrical supply source 27 by the operation of the timing mechanism, and the lower heating element 17 and its thermostat will be reconnected so that during the night hours, i. e., during the off-peak periods, the lower element will again operate to store relatively large quantities of hot water for the following day's use.

A very important feature of my invention is the arrangement of the time element switching mechanism 28 for controlling the heating elements 16 and 17 in that it is impossible for both of these elements to be energized at the same time; when the lower heating element 17 is rendered effective to heat the water in the tank, the upper heating element 16 cannot possibly be energized, whereas when the upper heating element is rendered effective to heat the water in the upper portion of the tank it is impossible for the lower heating element to be energized. It will be observed, therefore, that the peak load of the water heating system is definitely limited to the capacity of the respective heating elements. It will also be observed that if this were not the case and if both heating elements could be energized at the same time, it is quite possible that the load imposed on the power system 27 would be materially increased above and over that load which is imposed on the system by either of the elements alone.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A liquid heating system comprising a tank, heating means for applying heat to different portions of said tank, switching means selectively controlling said heating means to apply heat to said tank portions respectively arranged so that only one of said elements can apply heat to its tank portion at a time, and a timing device controlling said switching means to selectively control said heating means so that heat can be applied to said respective tank portions by said heating means only for predetermined intervals of time measured by said timing device.

2. An electrical hot water supply system comprising a water storage tank, a hot water draw-off at the upper end of said tank, a cold water inlet at the lower end of said tank, an immersion electrical heating element in the upper portion of said tank, a similar heating element in the lower portion of said tank, a source of electrical supply for said heating elements, electrical connections between said heating elements and said supply source, a switch in said electrical connections movable between a pair of controlling positions arranged so that when in one of said positions said lower heating element is connected through said switch to said supply source, and when in the other of said positions said upper heating element is connected through said switch to said supply source, a time element mechanism for controlling said switch to effect alternate movement thereof between said controlling positions at predetermined intervals of time so that each element can be connected with said supply source only during a predetermined interval of time as determined by the operation of said time element mechanism, and thermostats in the upper and lower portions of said tank substantially at the levels of said heating elements respectively, said thermostats being included in said electrical connections so as to control said elements, whereby when said lower heating element is connected through said switch to said supply source for its predetermined interval of time by operation of said time element mechanism, its thermostat operates to control its energization so as to maintain a predetermined high water temperature in said tank, and when said upper element is connected through said switch to said supply source for its predetermined interval of time by operation of said time element mechanism, its thermostat operates to control its energization so as to maintain a supply of water at a predetermined high temperature in said upper portion of said tank.

3. An electrical hot water heating system comprising a water storage tank, a plurality of electrical heating elements arranged to apply heat to the water at different levels of said tank, a source of electrical supply for said heating elements, means including a time element switching mechanism operably associated with said heating elements arranged to selectively connect said elements with said source of supply at predetermined intervals and for predetermined periods of time, and temperature control means responsive to the temperature of the water at said different levels controlling the respective heating elements at said levels so that each element applies heat to maintain a selected temperature at its level only when said element is connected with said supply source for its predetermined period of time by said time element switching mechanism and at no other time.

ALEXANDER G. PENDLETON.

CERTIFICATE OF CORRECTION.

Patent No. 1,996,625. April 2, 1935.

ALEXANDER G. PENDLETON.

It is hereby certified that error appears in the printed specification of the above numbered patent requiring correction as follows: Page 2, first column, line 20, for "C. G. Abbott" read C. C. Abbott; and line 21, for the patent number "1,522,922" read 1,522,992; and that the said Letters Patent should be read with these corrections therein that the same may conform to the record of the case in the Patent Office.

Signed and sealed this 11th day of June, A. D. 1935.

Leslie Frazer
Acting Commissioner of Patents.

(Seal)